United States Patent Office 3,359,097

Patented Dec. 19, 1967

3,359,097

METHOD OF PRODUCING THERMOELECTRIC BODIES

Emil R. Beaver, Jr., Tipp City, Ohio, assignor to Monsanto Research Corporation, St. Louis, Mo., a corporation of Delaware No Drawing. Filed June 28, 1965, Ser. No. 467,701
11 Claims. (Cl. 75—203)

ABSTRACT OF THE DISCLOSURE

A shaped thermoelectric body is produced by heating at a predetermined rate to a first maximum temperature of 1200° C. to 1500° C. while gradually increasing the pressure to consolidate and compact a mixture consisting essentially of (1) a siliceous material which may be silicon carbide or an Si-C mixture containing 65 to 75% by weight of Si and (2) from 2 to 20% by weight of an additive selected from the class consisting of Co, Th, Si nitride and the oxides, nitrides, carbides and silicides of Co, Th, Ni, Nb, Os, the alkaline earth metals, the rare earths of the La series and mixtures thereof and wherein the Si nitride and the alkaline earth compound is present only when in admixture with at least one of the other additives; continuing to increase the temperature to a second maximum of 1900° C.–2400° C. without varying the pressure; and then gradually releasing the pressure as the temperature of the compact decreases to room temperature.

This invention relates to thermoelectric materials and more particularly to processes for producing shaped bodies having thermoelectric property and containing silicon, carbon and at least one doping element.

It is known that crystalline silicon carbide is a semiconductor which, owing to its very good thermal stability, is of considerable interest in thermoelectric application. However, the difficulty of preparing the crystalline material and the great, detrimental effect exerted upon the thermoelectric properties by even extremely minute quantities of impurities present in the crystalline silicon carbide have inhibited practical utilization thereof in the field of thermoelectrics.

Casting of molten silicon carbide to give shaped bodies generally gives coarse-grained, brittle objects having low thermoelectric efficiency.

Although powder metallurgy has been employed extensively in the fabrication of n- and p-type thermoelectric bodies, the production of satisfactory doped silicon-carbon by the hot-pressing technique has hitherto been unsuccessful owing to the high electrical resistivity and the high thermal conductivity of the compacts. Although the latter fault may be somewhat alleviated by introducing into the hot-pressing charge of siliceous material and dopant an additive which is dispersed, rather than solubilized during hot-pressing, the dispersed phase thereby obtained generally does not decrease electrical resistivity; on the contrary, in many instances, use of the dispersant serves to decrease thermal conductivity only at the cost of simultaneous increase in electrical resistivity.

In the copending application of Courtland M. Henderson and Emil R. Beaver, Jr., Ser. No. 283,196, filed May 27, 1963, there are disclosed thermoelectric bodies comprising a matrix of consolidated silicon and carbon having uniformly dispersed therein a particulate dispersant which has a solubility in the matrix of less than 10 mole percent at a temperature which is 60% of the absolute melting point of the matrix. The presence of the dispersed material lowers the thermal conductivity of the body. However, the electrical resistivity of the body was often increased owing to the dispersant so that the gain in thermal conductivity was cancelled by the increase in resistivity.

An object of the invention is to provide silicon/carbon thermoelectric bodies having improved thermoelectric properties. Another object of the invention is the provision of a process of doping a silicon-carbon matrix to obtain valuable thermoelectric materials. Still another object is the provision of a hot-pressing method for the production of improved thermoelectric materials from a mixture of silicon, carbon and dopant. A further object is the provision of a hot-pressing method for the production of improved thermoelectric materials from silicon carbide and dopant. A most important objective is the provision, by hot-pressing, of solid solutions comprising shaped bodies having improved high temperature n-type thermoelectric characteristics.

These and other objects hereinafter defined are met by the invention wherein there is provided the method of making a shaped body having thermoelectric property which comprises placing in a die a finely comminuted charge consisting essentially of (1) a siliceous material selected from the class consisting of silicon carbide and a mixture of silicon and carbon having a silicon content of from 65 to 75 percent by weight with the balance of the mixture being carbon, in admixture with from 2 to 20 percent by weight of the total weight of the charge of (2) an additive selected from the class consisting of cobalt, thorium and silicon nitride and the oxides, nitrides, carbides and, silicides of, cobalt, thorium and nickel, of the alkaline earth metals and of the rare earths of the lanthanide series, at least one of said additives being other than silicon nitride and an alkaline earth metal compound, gradually heating the charge to a first maximum temperature of 1200°–1500° C. while gradually increasing mechanical pressure to the charge to obtain, upon reaching said first maximum temperature, consolidation of the charge and compacting of the consolidated charge to from 90 to 100 percent theoretical density, heating the resulting compact to a second maximum temperature of 1900° C. to 2400° C. without substantially varying the pressure, and then gradually releasing the pressure as the temperature of the compact is decreased to room temperature.

The invention is based on the surprising discovery that the aforesaid additives can be incorporated homogenously to give a solid solution in the siliceous matrix when, instead of gradually increasing the pressure while heating to 2000° C. and above, increase in pressure is halted after consolidation and compacting to within at least 10% of theoretical density, but not substantially varied from that which was in force when consolidation and compacting to said density occurred. Without the subsequent heating to at least 1900° C. and under constant pressure the consolidated material is a multiple-phase product having less desirable thermoelectric and mechanical properties. Additives which are in the dispersed state when consolidation and compacting to within 10% of theoretical density is not attained before 1500° C., become solubilized upon heating to 1900° C.–2400° C. if the pressure is neither released nor increased. The solid solution thereby obtained possesses the low thermal conductivity and the high electrical conductivity required for supporting a valuable Seebeck coefficient and attaining good figure of merit.

In practicing the invention, the following procedure is advantageous: The powdered formulation is loaded into a compacting die, which may or may not be lined with, say, boron nitride. The charge is then subjected to a gradual increase in the ram pressure as the temperature is increased. The rate of temperature increase is adjusted to the rate of increase in pressure so that by the time that the formulation consolidates, the charge is within about 10% of theoretical density. Die dimensions and nature and quantity of the charge determine thermal and pressure cycles. Arriving at a proper rate of pressure increase to assure substantially theoretical density of the consolidated charge is a matter of simple, routine experimentation by those skilled in the art. Usually, for the manufacture of a one inch cylinder having a diameter of 0.5″, the temperature is increased at the rate of about 200° to 300° C. per minute, while the pressure is being increased at the rate of about 500 to 1000 p.s.i. per minute. The proper density is generally attained by the time that the temperature is from, say, 1200 to 1500° C. and the pressure is from 3000 to 5000 p.s.i. The pressure thus reached is then maintained, while continuing the heating at substantially the same rate to a temperature of from about 1900° C. to 2400° C. Heating to this temperature under pressure appears to bring about homogeneity in the initially obtained consolidated product. Although the nature of the chemical or physical reactions which are involved is not known, it may be that during this second heating step there are formed molecular compounds which are mutually soluble to the extent that a solid solution is formed. In order to assure complete homogeneity, the temperature may be maintained at the 1900°–2400° C. maximum for a time of, say, from a few minutes to an hour. However, this precaution is usually unnecessary, since the phenomenon is not one of annealing but a gradual conversion of a multiphase product in which some material is present in a dispersed phase to a substantially homogenous, solid solution. In order to avoid thermal shock, decrease in temperature from the 1900°–2400° C. maximum is gradual and is accompanied by a likewise gradual decrease in pressure, i.e., all extraneous heating and all mechanical pressure is not suddenly discontinued. Usually the rate of temperature decrease will be substantially the same as that used in attaining the maximum, and the rate of pressure decrease will be adjusted accordingly so that by the time room temperature has been reached, only enough pressure is being applied to maintain die closure.

In an attempt to explain production of efficient thermoelastic bodies by the present process, shaped bodies prepared as described above have been ground to a powder, and the powder was used as the charge in the first step of the process, i.e., it was heated gradually to 1400° C. while raising the pressure on the charge gradually to 4000 p.s.i. Instead of continuing the heating to the 1900–2400° C. maximum, as required by the present process, the consolidated material, having a substantially theoretical density was allowed to cool slowly while gradually diminishing the pressure. The shaped solid thus obtained did not possess the very good thermoelectric property of the solid from which the powdered charge had been prepared; rather, it resembled the product which had been obtained originally upon consolidation and before increasing the temperature at substantially constant pressure to the 1900–2500° C. maximum. However, when a shaped body obtained by proceeding according to this invention was ground to a powder, and the powder was subjected to all of the steps of the present process, the compact thus obtained had the thermoelectric property of the body from which it had been obtained. In further attempts to determine the reason for such differences, it was found that when no alkaline earth compound was present, the thermal conductivity of the product obtained in absence of the final heating step was much higher than that of the product in which the temperature had been raised to the 1900°–2400° C. maximum, as required by the present process. These experiments indicate that a definite structural modification is produced by variation of the fabrication temperature.

In the present process all of the above-disclosed additives except the alkaline earth compounds and silicon nitride probably function as dopants, i.e., their use determines the electrical charge of the compressed body. In the previously referred to Henderson and Beaver application, the alkaline earth metal compounds functioned as dispersants for the purpose of lowering thermal conductivity. In the present case when there is used in the charge an alkaline earth compound plus one of the additives hereinabove defined, the resulting compact has at least the good thermal conductivity which was obtained when the alkaline earth compound was present in the insolubilized, dispersed state which resulted from heating to above 1900° C. before attaining at least within 10% of theoretical density, and at the same time the electrical resistivity is significantly decreased over that which is obtained when the alkaline earth compound is dispersed. Apparently, the alkaline earth compounds do not function as dopants. Rare earth compounds of the lanthanide series, e.g., lanthanum, cerium and yttrium, apparently function as dopants, having either a negative or positive electrical effect. The compounds of cobalt, nickel and thorium, as well as elemental cobalt and nickel are particularly valuable dopants in the present process.

Other suitable dopants which may be used with the silicon-carbon matrix for preparing n-type thermoelectric bodies are, e.g., niobium and osmium in either the elemental form or as the oxides, nitrides, carbides and silicides. The use of germanium, boron and manganese and their corresponding compounds gives a p-type thermoelectric. Owing to the fact that p-type, high-temperature thermoelectric materials are more readily available than p-type high-temperature thermoelectric materials, the present invention is particularly directed at the fabrication of shaped bodies having n-type property.

As hereinbefore stated, the siliceous component of the charge may be either silicon carbide or a mixture of elemental silicon and elemental carbon in which the carbon is present in a quantity of from about 25%–35% by weight of the mixture, i.e., the elements are present in approximately the proportions present in molecular silicon carbide. As stated above, some of the dopants may also be used in the initial charge either in their elemental form or in the form of one of several molecular compounds, i.e., the dopant may be present as a silicide or carbide, an oxide or a nitride. When it is present as a silicide or a carbide there appears to be no difference between the final product obtained from these compounds and that obtained from the metal and carbon, i.e., a mixture of silicon, carbon and, e.g., cobalt, in the appropriate proportions yields a final product having substantially the thermoelectric property and mechanical strength of a similarly prepared final product from silicon, carbon and cobalt silicide. The final product obtained from silicon carbide and cobalt is substantially the same as that obtained from silicon carbide and cobalt silicide. Apparently, during the fabrication, there occurs dissociation of the silicon carbide and of the metal silicide or metal carbide and a subsequent recombination of the dissociated material to give the substantially same kind of solid solution.

When the dopant used in the charge is the oxide or nitride an additional phenomenon occurs. During the heating and pressing, employing temperatures of 1900° C. to 2400° C. and constant pressure according to the present process, the oxide or nitride dopant or alkaline earth additive dissociates as does the silicide; however, at least some of the oxygen or nitrogen which is evolved is trapped in elemental form and is introduced into the lattice of the matrix instead of recombining with other dissociation products. The thermoelectric property of bodies of the introduced oxygen or nitrogen are improved since inclusion of oxygen or nitrogen results in straining the lattice structure and thereby enhancing the n-type characteristic of the final product when an n-type dopant is used or the p-type characteristic when the p-type dopant is used.

The dopant component of the charge need not consist of only one additive, i.e., there may be used two or more different metals, either in their elemental form or as silicide, carbide, or oxide. When an alkaline earth additive is present, there must also be present at least one of the present dopant additives.

The invention is further illustrated by, but not limited to, the following examples.

*Example 1*

The following formulations were ground into a fine powder (200f):

| | Weight percent |
|---|---|
| (I) | |
| Silicon | 70.0 |
| Carbon | 30.0 |
| (II) | |
| Silicon | 66.38 |
| Carbon | 27.84 |
| Thorium dioxide | [1] 5.78 |
| (III) | |
| Silicon | 66.5 |
| Carbon | 28.5 |
| Cobalt | [2] 5.0 |
| (IV) | |
| Silicon | 68.13 |
| Carbon | 25.07 |
| Thorium dioxide | [1] 1.38 |
| Cobalt | [2] 5.42 |
| (V) | |
| Silicon | 62.84 |
| Carbon | 24.93 |
| Thorium dioxide | [1] 3.40 |
| Cobalt | [2] 8.83 |
| (VI) | |
| Silicon carbide | 88.0 |
| Thorium dioxide | [1] 4.0 |
| Cobalt | [2] 8.0 |

[1] As thorium.
[2] As cobalt.

The thorium dioxide and the silicon carbide used in the above examples was of 99% purity. The cobalt consisted of 95% cobalt and 5% cobalt oxide. The silicon and carbon was of 99.99% purity.

Portions (6.3 g.) of the formulations were respectively charged to 0.5" I.D. cylindrical boron nitride liners, and the charged liners were inserted into graphite compacting dies. The dies were then heated in a vacuum of $10^{-3}$ to $10^{-4}$ torr to a temperature of 1400° C. at a rate of 200° C./minute while compressing the charge by exerting on the die ram a pressure which increased at the rate of about 700 p.s.i./minute to 5000 p.s.i. At the end of that time approximately theoretical density had been attained for each charge. The pressure was maintained at about 5000 p.s.i. while heating was continued at approximately 200° C./minute to a temperature of 2050° C. Heat input was then gradually diminished to allow the die and its contents to attain room temperature within about ten minutes. At the same time, the pressure was gradually diminished so that by the time that room temperature had been attained, only enough pressure was being exerted to maintain die closure. The compacts thus obtained ejected readily from the die and were found to be smooth-surfaced and mechanically strong.

In order to evaluate them for uses as thermoelectric legs of couples to be used in high temperature thermoelectric generators, the electrical resistivity and the Seebeck coefficients of each compact was determined at about 1050° C. The following values were obtained:

| Couple from Formulation | Seebeck Coefficient, $\mu$v./° C. | Electrical Resistivity, $10^{-3}$ ohm/cm. |
|---|---|---|
| I | [1] 104.3 | 183.8 |
| II | [2] 86.1 | 17.0 |
| III | [2] 39.0 | 11.2 |
| IV | [2] 133.0 | 2.7 |
| V | [2] 114.0 | 2.4 |
| VI | [2] 116.0 | 2.5 |

[1] p-type.
[2] n-type.

The above data show that the undoped mixture of silicon and carbon (I) gives a p-type compact of high resistivity; that addition of thorium oxide as in (II) gives an n-type compact of much lower resistivity but a lower Seebeck value; that use of cobalt instead of thorium oxide as the additive as in (III) also gives an n-type compact with even lower resistivity, but with a poor Seebeck value, and that the use of both thorium oxide and cobalt gives n-type compacts having extremely low electrical resistivities and high Seebeck values.

For purposes of comparison, formulation V was also compacted by heating to 1930° C. within three minutes while increasing the pressure to 4000 p.s.i. by the end of this time. The rapid heating rate (over 600° C./minute) did not permit consolidation and attainment of the proper density, i.e., within 10% of the theoretical, until the temperature was well over 1500° C. At the end of the three minutes, application of pressure was continued at the same value, the temperature was increased to 2055° C. in two minutes, and maintained at about this value for an additional 4 minutes. The compact thus obtained was found to have a Seebeck coefficient of $-107$ $\mu$v./° C. (n-type) and an electrical resistivity of $21\times10^{-3}$ ohm cm., as compared to $-114$ $\mu$v./° C. and $2.4\times10^{-3}$ ohm cm., the respective values shown in the above table for the same formulation which had been processed by consolidating and attaining substantially theoretical density before allowing the temperature to exceed 1500° C.

*Example 2*

Employing the following formulation a compact was prepared as in Example 1 without varying the pressure in the high temperature heating step:

| | Mole percent |
|---|---|
| Silicon | 49 |
| Carbon | 49 |
| Nickel silicide ($Ni_3Si$) | 2 |

The compact was a strong, smooth unit which served as a useful n-type leg of a thermoelectric couple.

*Example 3*

The following finely ground (300f) formulation was prepared:

| | Weight percent |
|---|---|
| Silicon | 72.50 |
| Carbon | 26.75 |
| Thorium dioxide | 5.78 |
| Cobalt | 1.47 |
| Calcium oxide | 1.40 |

Portions of the above formulations were compressed as in Example 1, except that in some cases heating at above 1500° C. was conducted before the density of the charge was within 10% of the theoretical density. Heating was continued to 2100° C. in all cases, and in each instance pressure was gradually released only after having attained this maximum temperature, and then gradually as in Example 1. Since the theoretical density of the formulation is 3.19, according to this invention a density of at least 3.19–0.319 or 2.871 should have been attained at from 1200° C.–1500° C. and before stopping the increase in pressure. Testing of the resulting compacts for electrical resistivity at temperatures of about 1200° C. in order to determine their usefulness as the n-leg of the thermocouple component of a thermoelectric generator operated at about 1200° C. gave the following values:

| Compact No. | Density | Test Temp., ° C. | Electrical Resistivity, ohms-cm. |
|---|---|---|---|
| 1 | 3.08 | 1,208 | 2.32 |
| 2 | 2.99 | 1,245 | 3.74 |
| 3 | 2.90 | 1,206 | 8.97 |
| 4 | 2.64 | 1,208 | 15.39 |

The above data show that the closer is the density to the theoretical value of 3.19 before continuing the heating at above 1500° C., the lower is the electrical resistivity of the compact.

*Example 4*

The following formulations were prepared in fine powder form:

| | Weight percent |
|---|---|
| (I) | |
| Silicon | 72.50 |
| Carbon | 26.75 |
| Thorium | 5.78 |
| Cobalt | 1.47 |
| Calcium oxide | 1.40 |
| (II) | |
| Silicon | 56 |
| Carbon | 24 |
| Thorium dioxide | 10 |
| Cobalt silicide | 10 |
| (III) | |
| Silicon | 51 |
| Carbon | 27 |
| Thorium dioxide | 10 |
| Calcium oxide | 2 |
| Silicon nitride ($Si_3N_4$) | 10 |

The formulations were hot-pressed as were I–VI of Example 1 to give smooth, well-formed compacts which could not be crushed by hand and which were found to have the following properties at 1200° C.

| Compacts from Formulation No. | Electrical Resistivity, ohm cm. | Seebeck Coefficient μv./° C. |
|---|---|---|
| I | .006 | −109 |
| II | .003 | −103 |
| III | .003 | −108 |

The above data show that although good resistivities and Seebeck coefficients are obtained from all three formulations, both characteristics are favored by including the nitride in the formulation.

*Example 5*

The powdered formulation described in Example 3 was fabricated by first inserting, into the boron nitride liner of a die, a disc of graphite having a diameter of 0.375" and a thickness of 0.5", charging a 1.1 g. portion of the formulation on top of the disc, and then positioning the same dimensioned graphite disc on the top surface of the formulation. The second disc served as a ram in the hot-pressing process, which was conducted by heating to about 1300° C. at a rate of 200° C./min. while uniformly increasing the pressure to 5000 p.s.i., then holding at that pressure and heating to about 2100° C. Upon gradually allowing to cool to room temperature while slowly releasing the pressure, there was obtained a strong, smooth compact wherein the graphite discs were firmly united with the intermediate layer of the pressed formulation. Said intermediate layer was determined to have a density of 3.0, an electrical resistivity value of $3.7\times10^{-3}$ ohm cm. at 1200° C. and a Seebeck coefficient of −112 μv./° C. at the same temperature. It was thus eminently suited as an n-type thermoelectric leg of a couple for use in a thermoelectric generator, with the tightly bonded graphite discs serving as the hot and cold junctions.

Operating as above, but failing to increase the pressure to 4000 p.s.i. until the temperature had reached about 1800° C., and then continuing the heating to about 2100° C., there was obtained a likewise well-bonded, smooth compact. However, the density of the intermediate layer was found to be 2.6 and it had an electrical resistivity of $15.6\times10^{-3}$ ohm-cm. at 1200° C.

Fabrication of the thermoelectric bodies according to the presently provided process may be conducted in air or in controlled atmospheres of vacuum, e.g., at $10^{-3}$ to $10^{-5}$ torr or in an inert gas such as nitrogen or argon. Optimum control is obtained by working in either vacuum or in an inert atmosphere. Heating may be conducted by means of a furnace or by electrically heating the die. Low-frequency induction may be used for obtaining temperatures in excess of, say 2200° C. When manufacturing large quantities of shaped bodies which are to have the same thermoelectric properties, e.g., as in the fabrication of thermoelectric n-type legs for use in a multi-couple thermoelectric generator or thermopile, use of automatic temperature and pressure controls in order to assure bodies having unifom thermoelectric properties is recommended.

The particle size of the charge is not critical so long as it is finely comminuted, i.e., the particles may be of any size within the micron size range, e.g., below 325 Tyler mesh (below 100 Tyler mesh in some cases) and ranging from, say, 1 micron to 100 millimicrons.

Thermoelectric bodies made according to the present process are especially useful as the n-type thermoelectric legs of couples for high temperature operation wherein large differences (ΔT) between the hot and cold ends of the thermocouple legs make for high output of electrical power. The bodies may be shaped into any desired form, e.g., into cylindrical, rectangular rods or wafers for use as thermocouple components in thermoelectric apparatus generally e.g., in power generators, cooling units, and in all devices, including thermionic units or diodes and fuel cells where a power generating assembly indicates operation and use of thermoelectric materials at high temperatures. Thermocouple comprising the presently fabricated elements are formed by coupling with a substantially equally thermally stable thermoelectric body of opposite sign, i.e., those of the presently produced bodies which have n-type characteristics may be coupled with any convenient, high temperature p-type body, and a p-type body produced by the present process may be coupled with any convenient, high temperature n-type body.

While various specific examples have been described herein, it is to be understood that the invention is not limited in its scope to the embodiments described herein, but only as described in the appended claims.

I claim:

1. A method of preparing a shaped body having thermoelectric property comprising the steps of (A) placing in a die a finely comminuted charge consisting essentially of (1) a siliceous material selected from the class consisting of silicon carbide and a mixture of silicon and carbon having a silicon content of from 65 to 75 percent by weight with the balance being carbon, in admixture with from 2 to 20 percent by weight of the total weight of the charge with (2) an additive selected from the class consisting of cobalt, thorium, the oxides, nitrides, carbides and silicides of cobalt, thorium, nickel, nobium, osmium, the alkaline earth metals, the rare earths of the lanthanide series and mixtures thereof, and wherein the silicon nitride and the alkaline earth compound are present only when in admixture with at least one of the other of said additives, (B) increasing the temperature of the charge at a predetermined rate to a first maximum temperature of 1200°–1500° C. while gradually increasing mechanical pressure on the charge to obtain, upon reaching said first maximum temperature, consolidation of the charge and compacting of the consolidated charge to from 90 to 100 percent theoretical density, (C) continue increasing the temperature of the resulting compact at substantially said predetermined rate to a second maximum temperature of 1900° C., to 2400° C., without substantially varying the pressure, and (D) then gradually releasing the pressure as the temperature of the compact decreases to room temperature.

2. The method defined in claim 1, further limited in that the siliceous material is silicon carbide.

3. The method defined in claim 1, further limited in that the siliceous material is a mixture of silicon and carbon.

4. The method defined in claim 1, further limited in that the additive is a metal.

5. The method defined in claim 1, further limited in that the additive is an oxide.

6. The method defined in claim 1, further limited in that the additive is a nitride.

7. The method defined in claim 1, further limited in that the additive is a silicide.

8. The method defined in claim 1, further limited in that the additive is cobalt.

9. The method defined in claim 1, further limited in that the additive is thorium dioxide.

10. The method defined in claim 1, further limited in that the additive is a mixture of cobalt and thorium dioxide.

11. The method defined in claim 1, further limited in that the additive is a mixture of cobalt, thorium dioxide and calcium oxide.

References Cited

UNITED STATES PATENTS

| | | | |
|---|---|---|---|
| 3,132,488 | 5/1964 | Epstein | 75—226 X |
| 3,164,892 | 1/1965 | Lieberman | 75—201 X |
| 3,201,235 | 8/1965 | Mueller | 75—201 |
| 3,256,696 | 6/1966 | Henderson | 75—201 X |
| 3,256,697 | 6/1966 | Henderson | 75—201 X |
| 3,256,698 | 6/1966 | Henderson | 75—201 X |
| 3,256,699 | 6/1966 | Henderson | 75—201 X |
| 3,256,700 | 6/1966 | Henderson | 75—201 X |
| 3,256,701 | 6/1966 | Henderson | 75—201 X |
| 3,256,702 | 6/1966 | Henderson | 75—201 X |

CARL D. QUARFORTH, *Primary Examiner.*

BENJAMIN R. PADGETT, *Examiner.*

A. J. STEINER, *Assistant Examiner.*